A. STEIN.
FENDER FOR CARS, AUTOMOBILES, OR OTHER VEHICLES.
APPLICATION FILED SEPT. 2, 1909.

947,604.

Patented Jan. 25, 1910.

WITNESSES
H. G. Dieterich
P. F. Nagle

INVENTOR
Abraham Stein
BY
Diedersheim & Fairbanks
ATTORNEYS

UNITED STATES PATENT OFFICE.

ABRAHAM STEIN, OF PHILADELPHIA, PENNSYLVANIA.

FENDER FOR CARS, AUTOMOBILES, OR OTHER VEHICLES.

947,604.  Specification of Letters Patent.  Patented Jan. 25, 1910.

Application filed September 2, 1909. Serial No. 515,813.

*To all whom it may concern:*

Be it known that I, ABRAHAM STEIN, a citizen of the United States, residing in the city and county of Philadelphia, State of Pennsylvania, have invented a new and useful Fender for Cars, Automobiles, or other Vehicles, of which the following is a specification.

My invention consists of a fender for a car, automobile, or other vehicle, the same embodying means for retaining the frame or body of the fender in normal position and placing it in operative position, a resilient or yielding cushion, means for raising said frame or body, and means for disconnecting it from the vehicle, as will be hereinafter described and pointed out in the claims.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1:
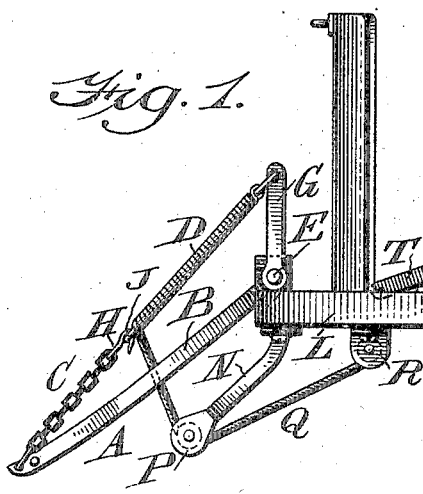
Figure 2:
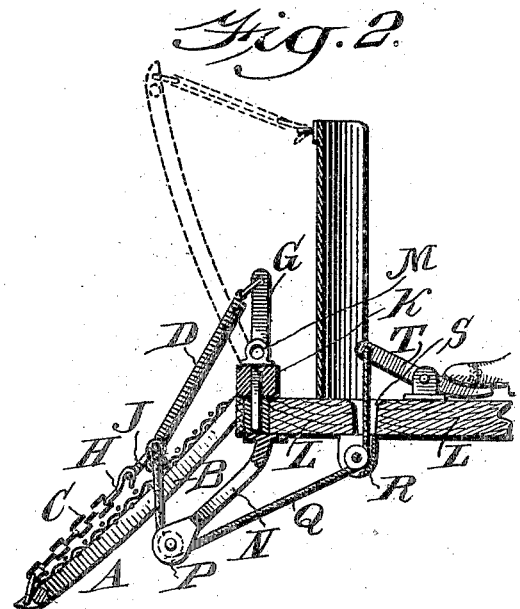
Figure 3:
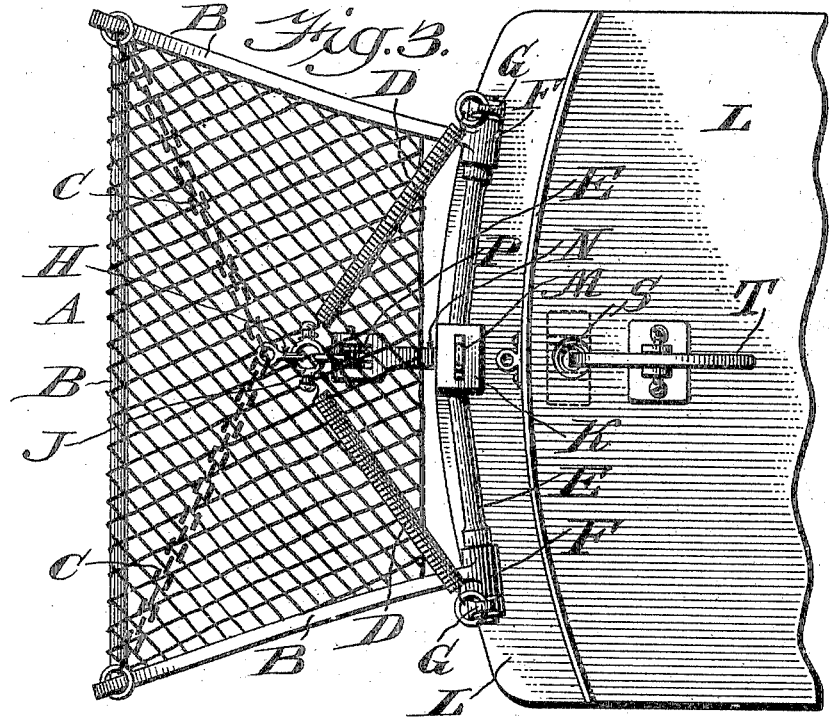

Figure 1 represents a side elevation of a fender in normal position. Fig. 2 represents a longitudinal vertical section thereof in lowered position. Fig. 3 represents a top or plan view thereof.

Similar letters of reference indicate corresponding parts in the figures.

Referring to the drawings, A designates a fender which is constructed of the frame B, the chains or cords C, the springs D, the rod E, on which the bosses F of the frame are rotatably mounted, the posts G which are secured to the ends of said rod and rise rigidly therefrom and have the rear ends of the springs D connected therewith, and the hook H which is attached to the rear ends of said chains C and is adapted to be fitted to the eye J which is attached to the forward end of the springs D, it being seen that the springs and chains converge and are joined at their apices by said hook and eye and form together a resilient or flexible cushion on which a person struck by the fender may fall, thus breaking the force of the fall while the netting of the cushion may subsequently receive the person. The springs D furthermore exert an upward draft on the chains C and so elevate the front of the fender, so as to hold it for practical purposes above a road-bed, car track, street, etc., as shown in Fig. 1.

The rod E is formed in sections, the inner ends of which are inserted in and secured to the sides of the block K, which is connected with the platform L of a vehicle by means of the bolt or pin M, which is passed through said block into said platform, permitting lateral oscillations of the fender on said platform and admitting, when withdrawn, of the disconnection and removal of the fender from the vehicle. In Fig. 3 the head of the bolt M is shown at right angles to that in which it is seen in Fig. 2, in which latter view said bolt is shown in side elevation, the block K being in section. The sections of the rod E form a support for the frame B, the function being the same as if the rod were in one piece.

N designates a hanger on which is mounted the pulley P, around which is passed the rope or chain Q, which also passes around the pulley R, said pulley being suitably connected with the platform of the vehicle. One end of said rope is attached to the eye J, and the other end thereof is passed through an opening S in the platform L and attached to the treadle T, which is mounted on said platform L within convenient reach of the feet of the motorman or driver of the vehicle.

It will now be seen that when a person is liable to be struck or caught by the fender, the motorman or driver quickly operates the treadle T so that its front limb rises, whereby draft is imparted to the rope Q, the same distending or expanding the springs D in downward direction and thereby relieving the chains C of tension so that the frame or body of the fender and connected parts drop, or are permitted to lower, and its front end is placed close to the road bed, car tracks, street, etc., as shown in Fig. 2, whereby the person as aforesaid will be directed upon and caught in the fender and carried safely thereon without liability of being rolled thereunder. When the treadle is released of the foot of the motorman or driver, the springs D are relieved, when they contact and so raise the chains, thus elevating the frame or body of the fender and placing the latter in normal position, as in Fig. 1.

When it is desired to place the fender in inoperative position, the hook H is disconnected from the eye J, when the frame with the connected parts may be raised and said hook attached to the dasher of the vehicle, as shown in dotted lines in Fig. 2, the effect of which is evident.

The resilient or flexible cushion, as such, composed of the cords or chains C and springs D may be removed and applied to fenders of other constructions.

Having thus described my invention, what I claim as new and desire to secure by Letters Patent, is:—

1. In a fender, a frame, means for attaching the same to a vehicle, a flexible member connected with said frame and a resilient member connected with said attaching means, said members being joined, and controlling means connected with said members at the joint thereof.

2. In a fender, a frame, a support adapted for lateral oscillation on a vehicle and adapted to attach said fender to said vehicle and form a bearing on which the frame may rotatably rise and fall, an arm projecting rigidly from said support, a flexible member connected with said frame, and a resilient member connected with said arm, whereby said frame is held in normal position and said members form a cushion on said frame.

3. In a fender, a frame, means for attaching the same to a vehicle, flexible and resilient members connected respectively with said frame and attaching means, devices for detachably connecting said members and controlling means connected with the joint between the flexible and resilient members.

4. In a fender, a frame, a support adapted for lateral oscillation on a vehicle and adapted to attach said fender to said vehicle and form a bearing on which the frame may rotatably rise and fall, an arm adapted to project rigidly from said support, and a resilient cushion secured respectively to said frame and arm.

5. In a fender, a frame, a support adapted for lateral oscillation on a vehicle and adapted to attach said fender to said vehicle and form a bearing on which the frame may rotatably rise and fall, an arm adapted to project rigidly from said support, and a resilient cushion secured respectively to said frame and arm, said cushion being formed of members detachably connected.

6. In a fender, a frame, means for attaching the same to a vehicle, a spring secured to the said frame and said attaching device adapted to elevate said frame, and means connected with said spring under control of the motorman or driver of said vehicle adapted to lower said frame.

7. In a fender, a frame, stationary rods on which the same is rotatably mounted, a block with which said rods are connected, and a bolt freely attaching said block to the vehicle and allowing lateral oscillation of the fender, said block and the platform of the vehicle having therein vertical openings respectively in alinement to receive said bolt.

8. In a fender, a frame attachable to a vehicle, resilient means for holding said frame in normal condition, a treadle on said vehicle, and a flexible connection for said resilient means and said treadle, and a guide for said connection whereby when said treadle is operated, said resilient means are distended and said frame is lowered to an operative position.

9. In a fender, a frame, stationary rods on which the frame is rotatably mounted, a block with which said rods are connected, means for securing said block to the adjacent portion of a vehicle, stationary posts rising from said rods, and resilient means attached to said bolts and the body of the fender for retaining the latter in elevated position.

ABRAHAM STEIN.

Witnesses:
JOHN A. WIEDERSHEIM,
HARRY C. DALTON.